(No Model.)

A. SHEPARD.
MEAT CUTTER.

No. 369,745. Patented Sept. 13, 1887.

Witnesses.
John Edwards Jr.
Theodore Buckley

Inventor.
Amos Shepard.
By James Shepard.
Atty.

UNITED STATES PATENT OFFICE.

AMOS SHEPARD, OF PLANTSVILLE, CONNECTICUT.

MEAT-CUTTER.

SPECIFICATION forming part of Letters Patent No. 369,745, dated September 13, 1887.

Application filed July 5, 1887. Serial No. 243,316. (No model.)

*To all whom it may concern:*

Be it known that I, AMOS SHEPARD, a citizen of the United States, residing at Plantsville, in the county of Hartford and State of Connecticut, have invented certain new and useful Improvements in Meat-Cutters, of which the following is a specification.

My invention relates to improvements in meat-cutters; and in general the objects of my improvements are to simplify the construction and to increase the efficiency of the machine.

Figure 1:
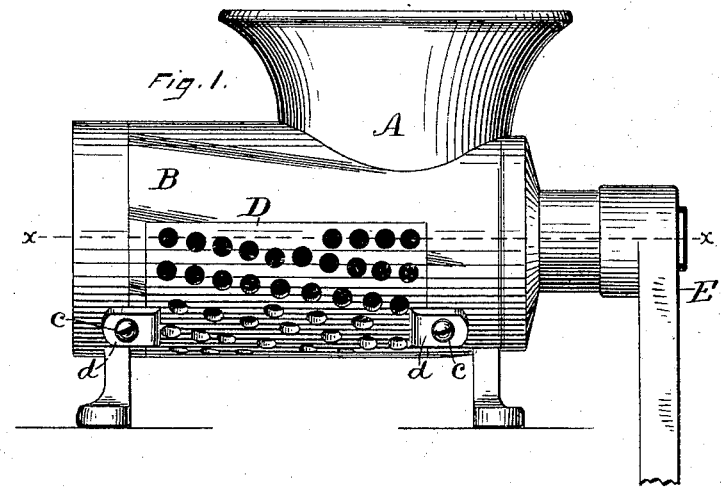
Figure 2:
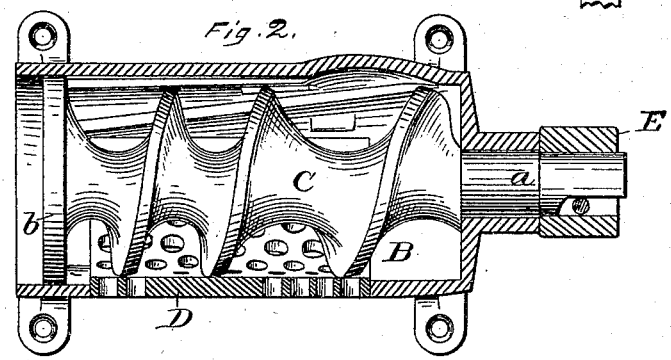
Figure 3:
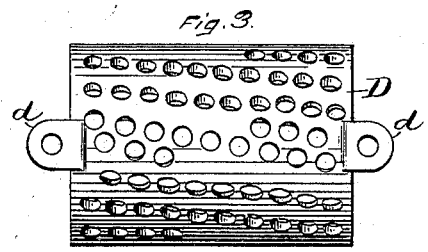
Figure 4:
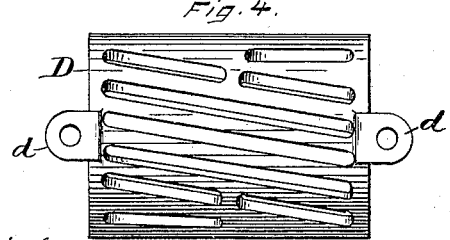

In the accompanying drawings, Figure 1 is a side elevation of my machine. Fig. 2 is a horizontal section of the case on line $x\ x$ of Fig. 1, the screw and its shaft being shown in elevation. Fig. 3 is a detached view of one part of the case, and Fig. 4 is a like view showing a slightly different construction.

The hopper A, main portion of the case B, and the feed-screw C may, in their general form, be of ordinary construction. The feed-screw C may be journaled in the case in any proper manner and driven by a crank, E, or other driver. As shown, it is provided with a journal, $a$, at one end, which takes its bearing in one end of the case, while the periphery of the feed-screw and the disk $b$ at the end of said screw take their bearings, respectively, in the body and end of the case, the disk $b$ serving also to close one end of the said case. The interior of the case may be ribbed or grooved, as in other meat-cutters, to facilitate feeding and to partially cut the meat in connection with the screw. The top or periphery of the screw-thread is beveled back a little, as clearly shown, so as to form a better cutting-edge on the forward side of the thread; but this feature of itself is not new.

One part, D, of the case is provided with peripheral slots or openings of any desired form, the solid metal by the sides of said slots or openings at the inside of the case forming shear blades or cutters, which act in connection with the feed-screw to cut the meat, while the openings allow the meat to be discharged from the case as soon as it is cut. The inner surface of the part D, between the openings, may be smooth or ribbed and grooved in the ordinary manner of ribbing or grooving the interior surface of meat-cutter cases. I also prefer to make this part D, which contains the openings, adjustable, so that it may be adjusted toward the periphery of the feed-screw to take up wear. As shown, I accomplish this by the screws $c\ c$, which pass through lugs $d\ d$ into threaded holes in the main portion of the case. Instead of making the adjustable part D extend only for a portion of the length of the case, the old and well-known construction of dividing the case into two parts for its whole length may be employed.

From the foregoing construction it will be seen that my cutter is composed of very few parts. The feed-screw acts to both force the meat along and to cut it, part of the cutting taking place immediately under the hopper, while the rest of the meat is forced along sufficiently to distribute it for cutting, and the meat is discharged radially through the openings in the case as fast as it is cut.

I claim as my invention—

1. In a meat-cutter, the combination of the feed-screw and the case, having shear blades or cutters and peripheral openings in the part which incloses the feed-screw, and acting in connection with said screw, substantially as described, and for the purpose specified.

2. In a meat-cutter, the combination of the feed-screw, the case formed in two parts, B and D, one part having shear-blades or cutters and peripheral openings, and devices for adjusting said part toward the feed screw, substantially as described, and for the purpose specified.

3. In a meat-cutter, the combination of the case, having shear blades or cutters and peripheral openings, and the feed-screw having a disk-like piece, $b$, at its end, which fills one end of the case, substantially as described, and for the purpose specified.

AMOS SHEPARD.

Witnesses:
E. G. LEWIS,
AUGUSTIN M. LEWIS.